United States Patent [19]

Hawley

[11] 4,226,256

[45] Oct. 7, 1980

[54] SOLAR PANEL ASSEMBLY AND SUPPORT PAD

[75] Inventor: Wilbur W. Hawley, Northridge, Calif.

[73] Assignee: Atlantic Richfield Company, Los Angeles, Calif.

[21] Appl. No.: 76,539

[22] Filed: Sep. 18, 1979

[51] Int. Cl.³ .......................................... H01L 31/04
[52] U.S. Cl. .................................. 136/244; 126/417; 126/450; 248/DIG. 10
[58] Field of Search ............ 136/89 P, 89 SA, 89 PC, 136/89 HY, 89 EP; 126/450, 417; 248/DIG. 10

[56] References Cited

U.S. PATENT DOCUMENTS

| 4,025,786 | 5/1977 | Hamilton | 250/211 R |
| 4,063,963 | 12/1977 | Bond, Jr. | 136/89 P |

OTHER PUBLICATIONS

P. S. Masser et al., "Fixed Angle & Seasonably Adjustable Structural Support Concepts For Solar Converters", *Conf. Record, 13th IEEE Photovoltaic Specialists Conf.*, (1978), pp. 1084–1089.

*Primary Examiner*—Aaron Weisstuch
*Attorney, Agent, or Firm*—Roderick W. MacDonald

[57] ABSTRACT

A solar panel assembly comprising at least one solar panel, support means for carrying said panel, and at least one support pad having a base plate, upstanding longitudinal sides, and spaced apart flange means for connection to said support means, said upstanding sides and opposed flange means defining an interior volume for receiving and holding weighting material.

7 Claims, 1 Drawing Figure

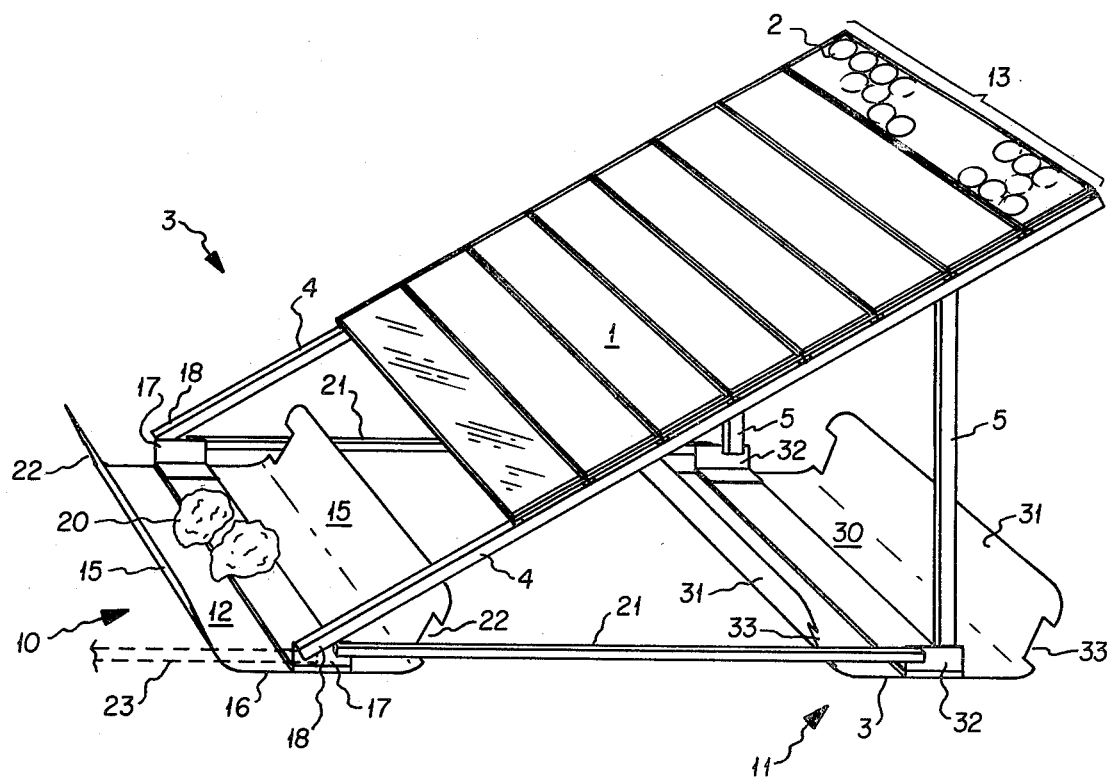

SOLAR PANEL ASSEMBLY AND SUPPORT PAD

BACKGROUND OF THE INVENTION

Solar panels such as photovoltaic panels for converting sunlight directly into electricity are often placed in operation in remote areas. In many of these remote areas transportation of the solar panel assembly to the point of operation is difficult at best. Further, in a number of such remote locations there is an abundance of weighting material such as rocks, sand, gravel, and the like, available.

Accordingly, it is highly desirable to have a solar panel assembly which is light weight and compact for transportation purposes but which can be made to be very heavy in order to hold the solar panel assemblies in place after being put into operation.

BRIEF DESCRIPTION OF THE INVENTION

In accordance with this invention there is provided a solar panel assembly support pad which has a base plate which carries along its longitudinal edges upstanding sides, and which also carries flange means at opposite ends of the base plate and in between the upstanding sides, the flange means being adapted to be fixed to support means for the solar panel assembly, the upstanding sides and opposed flange means defining an interior volume for receiving and holding weighting material.

There is also provided in accordance with this invention a solar panel assembly comprising at least one solar panel, support means for carrying said at least one solar panel, and at least one support pad in accordance with this invention as aforesaid.

Accordingly, it is an object of this invention to provide a new and improved solar panel assembly. It is another object to provide a new and improved support pad for a solar panel assembly.

Other aspects, objects and advantages of this invention will be apparent to those skilled in the art from this disclosure and the appended claims.

BRIEF DESCRIPTION OF THE DRAWINGS

The drawings show an exemplary solar panel assembly with support means and two spaced apart support pads in accordance with this invention.

DETAILED DESCRIPTION OF THE INVENTION

More specifically, the drawing shows a plurality of photovoltaic solar panels 1, each panel carrying a plurality of individual photovoltaic cells 2, all such cells 2 and panels 1 being connected together electrically to produce an electrical output from the overall assembly 3.

It should be noted that although this invention is described with respect to photovoltaic solar panels, this invention is also applicable to other solar panel assemblies such as thermal solar panels which use sunlight to heat a fluid such as water, and the like.

Solar panel assembly 3 is supported at the opposing ends of panels 1 by a pair of spaced apart, upwardly angled support members 4. Attached to support members 4 are a pair of spaced apart, upwardly inclined, essentially vertical in this embodiment, support members 5. In this example of the invention, members 4 and 5 comprise the support means for assembly 3.

The support pads of this invention for assembly 3, are, in the example of the drawing, two spaced apart pads 10 and 11.

Support pad 10 is comprised of a base plate 12 whose longitudinal axis is essentially parallel to width 13 of panels 1. Pad 10, therefore, has a length which is approximately the same as the width of the assembly 3. The longitudinal edges of base plate 12 have fixed thereto a pair of upstanding sides 15. The lateral ends 16 of base plate 12 carry a pair of flange means 17 which are adapted to be attached to the support means of assembly 3. In the embodiment of the drawing, lower ends 18 of support members 4 are bolted to flange means 17. Of course, other configurations of flange means, support means, means for fixing the flange means to the support means, and the like can be employed as would be obvious to those skilled in the art.

Upstanding sides 15 and spaced apart flange means 17 define an interior volume for pad 10 which can receive and hold weighting material such as rocks 20 once the assembly is in place and desired to be fixed in place with locally available weighting material.

Pads 10 and 11 are fixed in their spaced apart relationship by a spaced apart pair of essentially horizontally extending members 21 which are fixed to the respective flange means of pads 10 and 11. In order to allow members 21 to reach the internal flange means, apertures 22 are employed in upstanding sides 15. Apertures are employed in the embodiment of the drawing in both upstanding sides 15 so that it matters not, upon assembly at the site of operation, which side means is inside or outside of the assembly, and also to facilitate joining a plurality of assemblies to one another in line as shown by the dotted lines representing yet another horizontally extending member 23 which would be connected to another support pad (not shown) located in front of assembly 3. This same sort of arrangement could be made for another assembly behind assembly 3 with yet another horizontally extending member (not shown) connected to the flange means of pad 11.

Pad 11 is shown also to have a width approximately the same as width 13 of panels 1, and to have a base plate 30 with upstanding longitudinal sides 31 and flange means 32 at opposite ends of and near the lateral ends of base plate 30. Upstanding sides 31 and flange means 32 of pad 11 also define an interior volume which can receive and hold weighting material. Suitable weighting material such as sandbags, gravel, logs, and the like can be employed as well as or in lieu of rocks. Apertures 33 are employed in sides 31 for reasons similar to those set forth hereinabove with respect to apertures 22 of pad 10. Pad 11 can be formed of any desired material such as metal, plastic, concrete, glass fiber, reinforced concrete, and the like.

Reasonable variations and modifications are possible within the scope of this disclosure without departing from the spirit and scope of this invention.

The embodiments of the invention in which an exclusive property or privilege is claimed are defined as follows:

1. A pad adapted for supporting an associated solar panel assembly, comprising a longitudinally extending base plate having longitudinal edges joined by opposing lateral ends, the length of said base plate adapted to be approximately the width of said associated solar panel assembly, upstanding sides extending along said longitudinal edges of said base plate, flange means at opposite ends of said base plate and near said lateral ends, said upstanding sides having apertures therein along said lateral ends adapted to allow support members from said associated solar panel assembly to reach said flange means, said upstanding sides and opposed flange means defining an interior volume for receiving and holding weighting material.

2. Apparatus according to claim 1, including a solar panel assembly comprising at least one solar panel, support means for carrying said at least one solar panel, wherein at least one said support pad is fixed to the opposite end of said support means from said at least one solar panel.

3. Apparatus according to claim 2 wherein first and second support pads are employed.

4. Apparatus according to claim 3 wherein said first and second support pads are fixed in a spaced apart relation by at least one essentially horizontally extending member, said member passing through at least some of the apertures in said upstanding sides.

5. Apparatus according to claim 4 wherein said support means comprises a first pair of upwardly inclined support members fixed at their lower ends to the flange means of a first support pad, said first pair of support members carrying a plurality of said solar panels, and a second pair of upwardly inclined support members fixed at their upper ends to said first pair of support members and at their lower ends to a second support pad.

6. Apparatus according to claim 1 or 2 wherein said support pad is composed of metal, plastic, concrete, glass fiber, and reinforced concrete.

7. Apparatus according to claim 2 wherein said solar panel comprises a plurality of photovoltaic cells.

* * * * *